(12) United States Patent
Scarlett

(10) Patent No.: US 6,428,014 B2
(45) Date of Patent: Aug. 6, 2002

(54) PISTON SEALING RING ASSEMBLY

(75) Inventor: Stephen George Scarlett, Ipswich (GB)

(73) Assignee: CompAir Reavell Ltd., Ipswich (GB)

( * ) Notice: Subject to any disclaimer, the term of this patent is extended or adjusted under 35 U.S.C. 154(b) by 0 days.

(21) Appl. No.: 09/264,062

(22) Filed: Mar. 8, 1999

(30) Foreign Application Priority Data

Mar. 10, 1998 (GB) .............................................. 9805124

(51) Int. Cl.$^7$ .............................................. B60T 11/236
(52) U.S. Cl. ...................... 277/435; 277/448; 277/446; 277/946; 417/248; 417/249
(58) Field of Search ................. 277/435, 448, 277/446, 496, 498, 946; 92/218, 249; 417/254, 246, 399, 403, 536, 568

(56) References Cited

U.S. PATENT DOCUMENTS

| | | | | |
|---|---|---|---|---|
| 3,784,215 A | * | 1/1974 | Ruthenberg | 277/435 |
| 3,917,290 A | * | 11/1975 | Geffoy | 277/75 |
| 4,256,318 A | * | 3/1981 | Bush | 277/435 |
| 4,615,531 A | * | 10/1986 | Green | 277/446 |
| 5,392,692 A | * | 2/1995 | Rao et al. | 277/168 |

FOREIGN PATENT DOCUMENTS

| | | |
|---|---|---|
| DE | 584 404 | 9/1933 |
| DE | 35 02 844 | 3/1986 |
| GB | 2 098 701 | 5/1983 |

OTHER PUBLICATIONS

Morganite Special Carbons May 2, 1995.
TFE Piston Seals (8–Pages).
European Search Report dated Sep. 28, 1998.

* cited by examiner

Primary Examiner—Anthony Knight
Assistant Examiner—Enoch Peavey
(74) Attorney, Agent, or Firm—Nields & Lemack

(57) ABSTRACT

A piston sealing ring assembly (70) for sealing the piston/cylinder interface of a double-acting gas compressor including a first and second cut piston sealing ring (54,72) each bounded by first and second planar surfaces (6,8), the first piston sealing ring (54) having an overlapped cut with generally circumferentially extending inner and outer overlapping portions (56,58) which contact each other to form a continuous seal extending from the first surface (6) to the second surface (8) of the first piston sealing ring (52) and separating an inner ring gap (62) from an outer ring gap (64). The periphery of the outer ring gap (64) of the first piston sealing ring (54) at the first surface (6) is sealed by the second surface (8) of the second piston sealing ring (72). The second piston sealing ring (72) is similarly disposed in relation to the first piston sealing ring (54) so its outer ring gap (64) is sealed at the second surface (8) by the first surface (6) of the first piston sealing ring (54). The present invention provides a piston sealing ring assembly which can provide two-way seal in a manner which is more easily accurately manufactured.

14 Claims, 3 Drawing Sheets

PISTON SEALING RING ASSEMBLY

This invention relates to piston sealing rings for reciprocating fluid pumps or compressors or vacuum pumps and, in particular, to a piston sealing ring assembly of especial, but not exclusive, application to single or double acting oil-free reciprocating air and/or gas compressors.

The basic operational principle of fluid reciprocating pumps or compressors is to draw fluid into a cylinder through a one-way valve by linear movement of a piston sliding in sealed relationship within the cylinder and then to expel the fluid from the cylinder through a further one-way valve by reversing the direction of movement of the piston within the cylinder. The efficiency of the pump is determined to some extent by the quality of the seal between the piston and cylinder as any fluid that is forced between them and past the piston from the higher pressure side to the lower pressure side during the pumping or compression stroke uses an energy input that is then no longer available to usefully pump or compress the fluid.

One approach to sealing the piston/cylinder interface is to size the piston to be a close fit in the cylinder and lubricate the small gap with an oil film using oil from a sump which enters the cylinder on the side of the piston away from the fluid being pumped or compressed. Generally an oil scraper is provided to recirculate oil spread up the wall of the cylinder back to the sump via the interior of the piston.

The gap between the piston and cylinder is sealed against ingress of the fluid being pumped or compressed by one or more piston sealing rings each located in a respective annular retaining recess.

Known piston sealing rings for use in such oil lubricated pumps or compressors are so called "cut" sealing rings, for example of cast iron, the cut being made to remove a small section of the ring to form a circumferential ring gap in the ring and having an outer diameter a little larger than the inner diameter of the cylinder and as shown in FIG. 1. The ring gap allows the ring's diameter to be reduced for insertion into the cylinder while being retained in the annular recess whereafter it is free to expand outwards by virtue of its inherent resilience towards its original diameter and into sealing contact with the cylinder. Such a piston sealing ring is shown at FIG. 1.

As the piston sealing ring undergoes thermal expansion due to heating when in use, the gap in the ring reduces in size as the ring is constrained from further radial expansion by the cylinder. The circumferential extent of the gap is therefore chosen so that it will not close up when the pump or compressor is operated within its design parameters. The necessary presence of the ring gap provides a small leakage path for the pressurised fluid past the piston sealing ring as follows.

The fluid under compression relative to the fluid at the other side of the piston acts to force the piston sealing ring into sealing contact with the annular wall at the lower pressure side of the recess. It will not be in sealing contact with the annular wall at the higher pressure side of the recess nor with the inner circumferential surface of the recess (due to the outward expansion of the ring). Assuming, for descriptive convenience only, that the higher pressure side of the piston is the upper side there is a leakage path for the fluid down the gap between the upper portion of the piston and cylinder, between the piston sealing ring and the upper annular surface of recess, behind the piston sealing ring between its inner circumferential surface and the recess, though the ring gap in the piston sealing ring, and finally down the gap between the piston and cylinder gap below the piston sealing ring.

The leakage rate due to this leakage path is primarily determined by the area of overlap of the ring gap at the sealed (lower) side of the piston sealing ring and the gap between the piston and cylinder. For oil-sealed fluid pumps or compressors the area of overlap is sufficiently small, due to the close fit of the piston in the cylinder, that the leakages produced in most applications can be considered to be small.

In some applications it is necessary to ensure there is no contamination by lubricating oil of the fluid being pumped or compressed in which case an oil-free piston/cylinder arrangement can be employed. Known arrangements of oil-free pumps or compressors or vacuum pumps have a piston with an outer diameter some 1 to 3 mm smaller than the cylinder and which are provided with a rider ring retained in an annular recess in the periphery of the piston which is a closer but non-sealing fit in the cylinder to centre the piston in the cylinder as it moves within it. In such oil-free piston/cylinder arrangements it is usual to seal the gap between the piston and cylinder by a cut piston sealing ring, in the manner described above in relation to oil-lubricated piston/cylinder arrangements, but the piston sealing ring has to be of a material which is self-lubricating relative to the material of the cylinder, for example carbon graphite filled PTFE.

The leakage path discussed above in relation to an oil-lubricated apparatus with a cut sealing ring also exists with oil-free piston/cylinder apparatus but the leakage is greater, all other things being equal, because the area of overlap of the ring gap in the piston sealing ring (because of the increase in thermal expansion rate of PTFE type rings) and gap between the piston/cylinder is greater (because of the increased size of the latter) and can be sufficiently large to have a significant effect on the efficiency of such fluid pumps or compressors.

It is also known to form a piston ring assembly for an oil-free fluid pump or compressor or vacuum pump by stacking two piston sealing rings each with a ring gap as described above but circumferentially offset from each other as shown in FIG. 2. However, the leakage is still determined by the area of the overlap of the ring gap at the low pressure side of the sealing piston ring and the gap between the piston/cylinder as the higher pressure fluid can still enter the interior volume between the inner circumferential surface of the piston sealing ring and the annular recess and then pass to the gap at the lower pressure side to the leak between the piston/cylinder as before.

A known prior art piston sealing ring which can provide better sealing has a finger-like extension which extends from one side of the ring gap into sliding engagement with a complimentary notch at the other side of the ring gap as shown in FIG. 3. In this case the overlap region of the ring gap and the piston/cylinder gap at the lower pressure side of the piston sealing ring (which is to the upper side of the piston sealing ring of FIG. 3 in use) can, if the sealing ring is accurately manufactured, communicate with the volume between the piston sealing ring and annular recess only by passing between the finger and the surfaces at the notch against which it sealed. The area of overlap of the ring gap and the gap between the piston and cylinder therefore does not determine the leakage rate of this piston sealing ring rather it is determined by the quality of seal provided by the finger and notch.

There are, however, a number of disadvantages associated with this last described piston sealing ring.

It is necessary to employ two-axis milling operations to create the interlocking finger/notch structure.

The piston sealing ring notch and finger must be accurately dimensioned to avoid unwanted leakage. If the notch is too shallow in the axial direction the axial seal against the lower pressure side of the piston sealing ring recess will be broken. If the notch is too deep in the radial direction the circumferential seal between the finger and notch could be broken when the ring expands to conform to a cylinder's inner diameter. If the notch is too shallow in the radial direction the circumferential seal of the sealing ring to the cylinder will be adversely affected, although this would improve as the finger wears differentially until it become sized to the radial depth of the notch.

Further, engineering constraints require a given thickness of material for the finger (dependent on operating conditions and ring diameter and material, for example) and the axial depth of such piston sealing rings generally has to be about twice the finger depth.

It is also to be noted that the finger is formed as part of the outer circumferential portion of the sealing ring. This means the finger is exposed to wear in use and needs to be radially wide enough initially to be of sufficient mechanical strength when worn during use to provide a satisfactory useful life to the ring.

These disadvantages are present whether the piston sealing ring is used to seal a single or double action fluid pump or compressor, but in the latter case there are additional disadvantages of the above described piston sealing ring with a finger/notch sealing arrangement. As this sealing ring is only able to seal in one direction, it is necessary to use two of them, each located in a corresponding annular recess in the piston to seal a double action pump or compressor. This requires a total axial depth of sealing ring in the region of four times the axial depth of the finger and two distinct annular recesses to hold them, all of which place dimensional constraints on the minimum length of the piston.

The present invention seeks to provide a piston sealing ring assembly which addresses these disadvantages of the prior art seals, and particularly these described in relation to the piston sealing ring of FIG. 3.

Accordingly there is provided a piston sealing ring assembly comprising a first and second cut piston sealing ring each bounded by first and second planar surfaces, the first piston sealing ring having an overlapped cut with generally circumferentially extending inner and outer overlapping portions which contact each other to form a continuous seal extending from the first surface to the second surface of the first piston sealing ring and separating an inner ring gap and an outer ring gap, the periphery of the outer ring gap of the first piston sealing ring at the first surface being sealed by the second surface of the second piston sealing ring.

The piston sealing ring assembly preferably is such that the outer overlapped portion of the overlapped cut is wider in a radial direction than the inner portion of the overlapped cut, for example twice as wide.

The inner portion of the overlapped cut is preferably formed so as to be resiliently biased towards the outer portion of the overlapped cut to provide a more secure sealing arrangement.

The piston sealing ring assembly may be such that the second piston sealing ring has an overlapped cut with generally circumferentially extending inner and outer overlapping portions which contact each other to form a continuous seal extending from the first surface to the second surface of the second piston sealing ring, the periphery of the outer ring gap of the second piston sealing ring at the second surface being sealed by the first surface of the first piston sealing ring. This provides a compact seal which can seal in two directions for use in a double-action gas compressor, for example.

Preferably, an interlocking means is provided for retaining the first and second piston sealing rings in a predetermined circumferential orientation. For example, the interlocking means may comprise a pin fixed in one of the piston sealing rings and engageable in a hole in the other piston sealing ring.

The piston sealing rings may be formed from a PTFE or a PTFE compound or other suitable self-lubricating material.

Embodiments of the present invention will now be described, by way of example only, with reference to the accompanying drawings of which:

In the drawings, equivalent features of the various sealing piston rings are denoted by the same reference numerals. The direction of the gas pressure, i.e. high to low, is indicated by the arrows G in the drawings.

Figure 1:
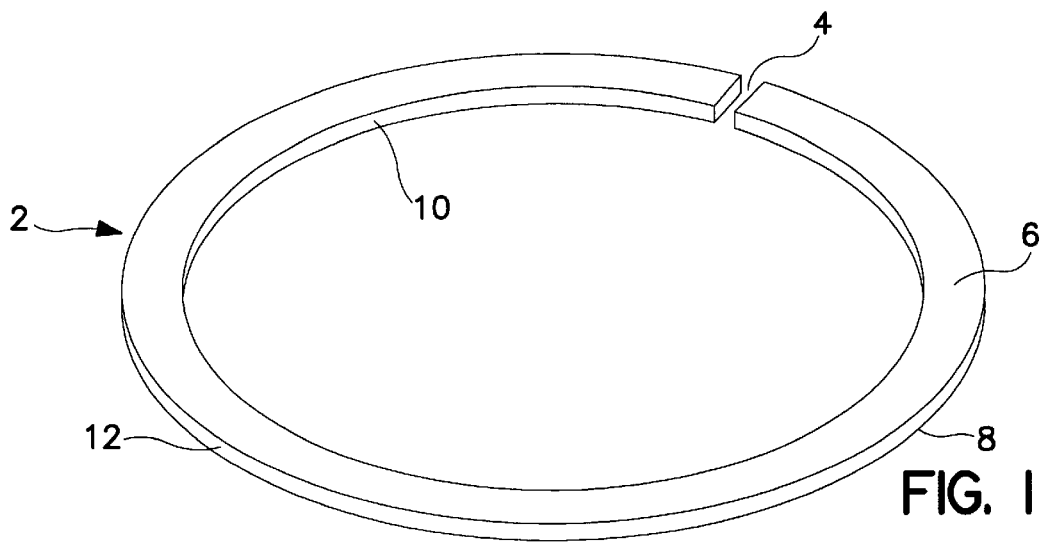
FIG. 1 is a diagrammatic perspective view of a prior art piston sealing ring.

FIG. 1 shows a known PTFE straight cut piston sealing ring 2 for a gas compressor of annular shape except for a section cut away to form a ring gap 4. The ring is bounded axially by first and second parallel planar surfaces 6,8 (of which only the first is visible in the view of FIG. 1) and radially by an inner circumferentially extending surface 10 and an outer circumferentially extending surface 12, which four surfaces 6, 8, 10, 12 will be conveniently referred to as the upper, lower, inner and outer surfaces of the ring 2, respectively.

Figure 4:
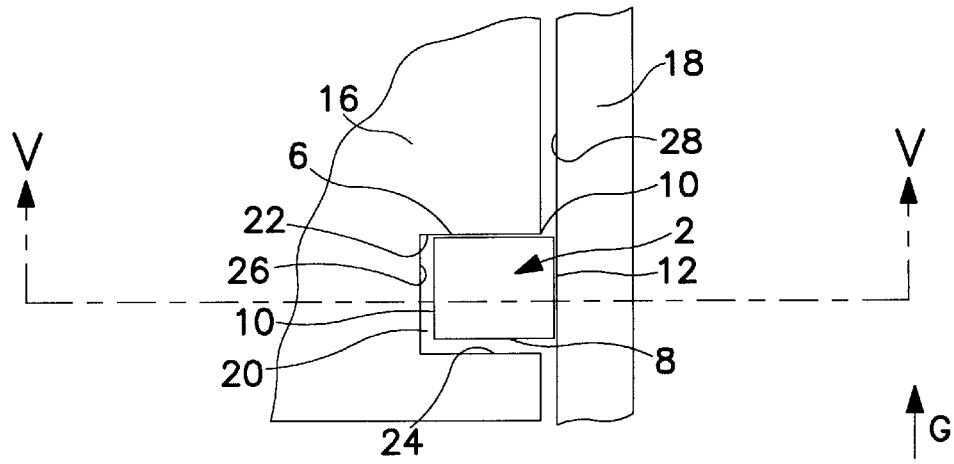
FIG. 4 is a diagrammatic part cross-sectional end view of a piston cylinder interface sealed by the piston sealing ring of FIG. 1.
Figure 5:
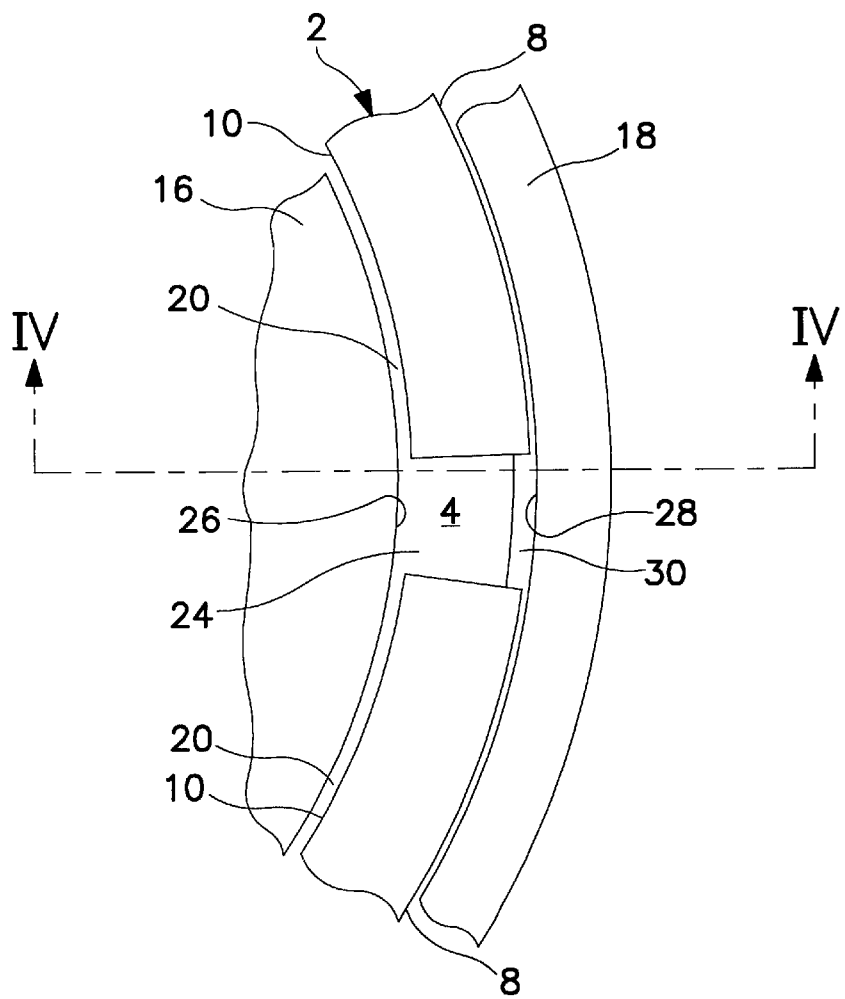
FIG. 5 is a diagrammatic part cross-sectional plan view of the piston of FIG. 4 in the direction V - V of FIG. 4.

Referring now also to FIGS. 4 and 5, a piston 16 is shown sealed to a cylinder of an oil-free air compressor by the piston sealing ring 2 of FIG. 1 located in an annular recess 20 in the outer surface of the piston 16 which recess has an upper axial surface 22, a lower axial surface 24 and an inner radial surface 26.

When the sealing ring 2 is subject to higher pressure to its lower side its upper surface 6 is forced into sealing relationship with the upper surface 22 of the recess 20. The outer surface 12 of the sealing ring 2 is already in sealing relationship with the inner surface 28 cylinder 18 by virtue of the resilience of the sealing ring 2 urging it to expand outwards. It can be seen that the inner and lower surfaces 10,8 of the seal 2 are not in sealing relationship with the facing inner and lower surfaces of 26,24 of the recess 20.

It can also be seen from FIGS. 4 and 5 that a leakage path from the higher pressure side of the piston exists up between the piston 16 and cylinder 18 past the lower surface 8 of the sealing ring 2 to the space between the inner surface 26 of the recess 20 and the sealing ring 2 and to the ring gap 4. As can be seen most clearly from FIG. 5, the ring gap 4 is in fluid communication with the piston/cylinder gap lower pressure side of the piston 16 where this gap overlaps the ring gap 4, that is overlap area 30 of FIG. 5. This overlap area provides the "bottleneck" of the leakage path.

Figure 2:
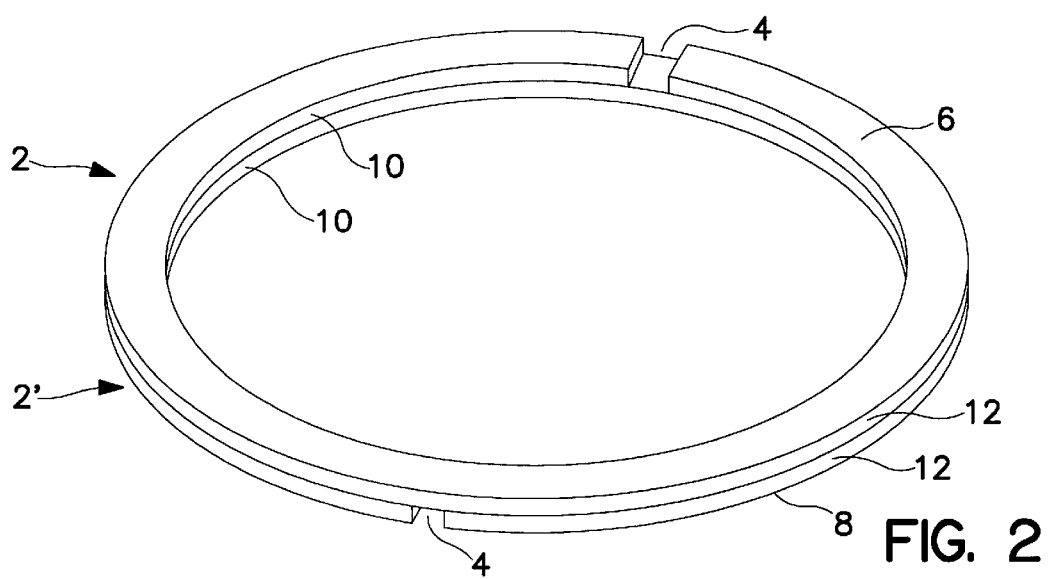
FIG. 2 is a diagrammatic perspective view of a prior art piston sealing ring assembly.

If the sealing ring 2 of FIGS. 4 and 5 were replaced by the piston sealing ring assembly of FIG. 2 (formed by two stacked rings 2,2' with non-overlapping ring gaps 4,4) the leakage path resistance would be unaltered. The fluid from the high pressure side of the piston 16 would still be in fluid communication with the space between the inner surface of the recess 26 and two inner surfaces 10,10 of the sealing rings 2,2' and so also with the ring gap 4 of the sealing ring 2 as before.

Figure 3:
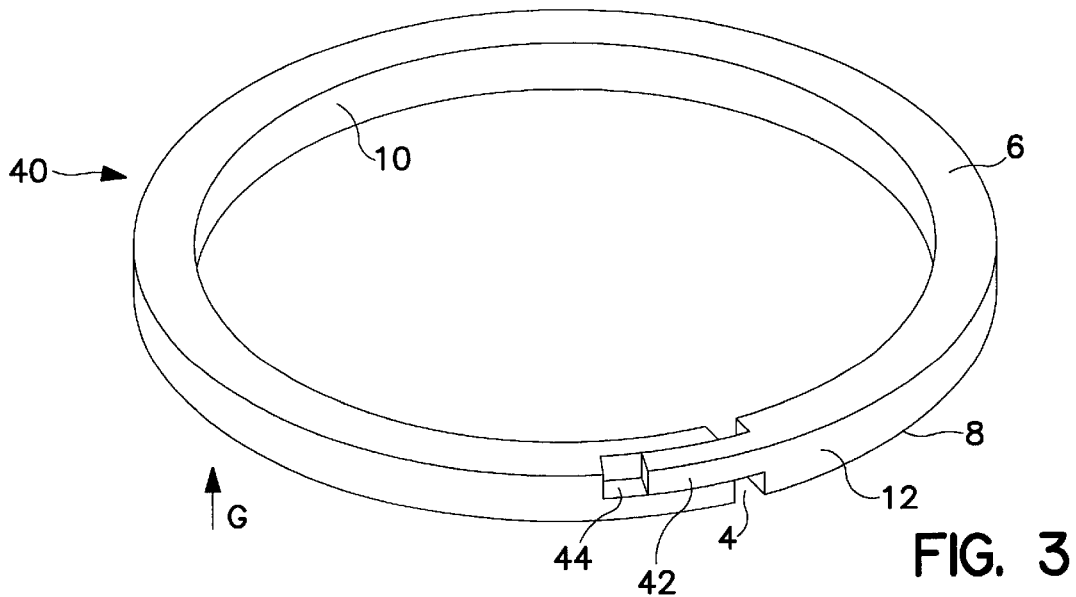
FIG. 3 is a diagrammatic perspective view of a further prior art piston sealing ring.

Referring now to FIG. 3, the further prior art piston sealing ring 40 already described has a gap 4 across which a finger 42 extends circumferentially from the upper and outer quadrant of one side of the ring gap 4 into sealing relationship with a notch 44 in the sealing ring 40 at the other side of the gap 4. The horizontal width of the finger 42 is about two-thirds the width of the annular ring 6.

It is assumed to be in place to seal recess 20 of the piston 16 the upper surface 6 will be sealed against the upper surface 22 of the recess in the piston and while there is a leakage path from the higher pressure side of the piston to the gap 4 there is, if the seal is accurately made, no fluid communication with the lower pressure side of the piston because the overlap area of the exposed portion of the notch 44 not occupied by the finger 42 and the piston/cylinder gap is sealed from the space between the inner surface 10 of the ring 40 and so is sealed from the gap 4.

It will be noted that the piston sealing ring 40 of FIG. 3 is a unidirectional seal and that it will not seal a piston to a cylinder if the higher pressure side is above the upper surface 6 of the ring 40. This is because the upper surface 6 would not be forced into sealing relationship with the upper surface 22 of the recess and so gap 4 itself would provide a leakage route. Consequently, to seal a double-acting air compressor piston to a cylinder it would require a pair of piston sealing rings of FIG. 3.

Figure 6:
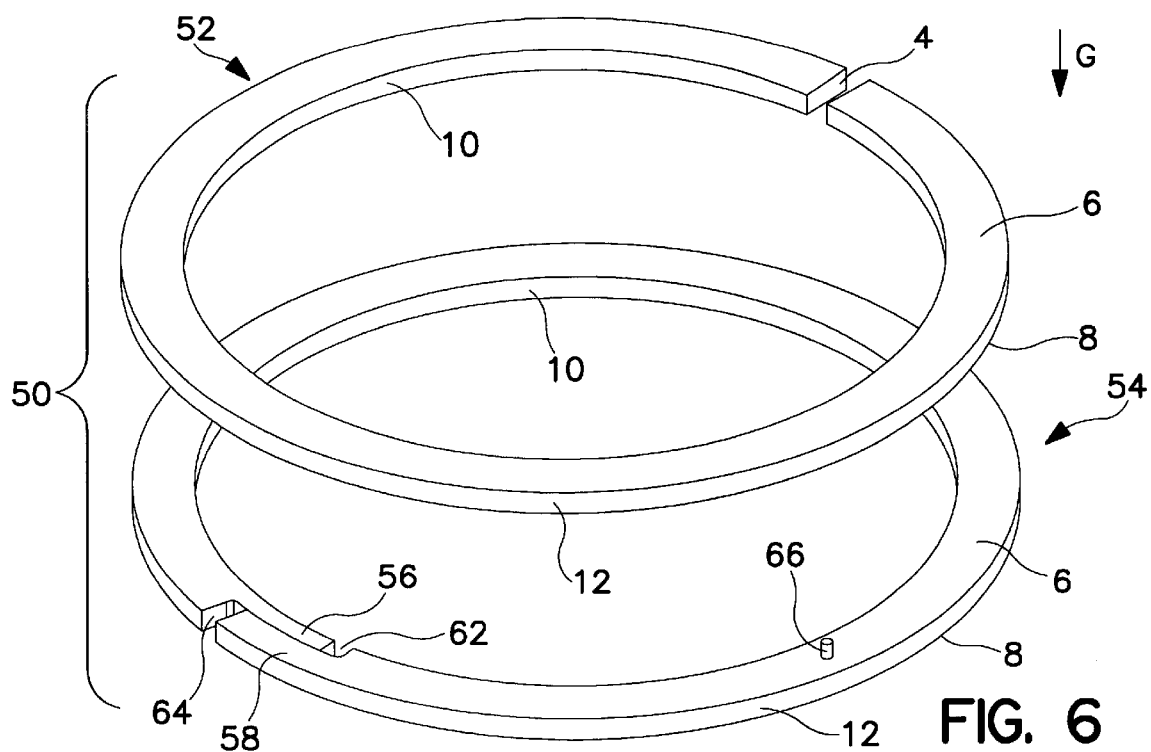
FIG. 6 is an exploded perspective view of a first embodiment of a piston sealing ring assembly according to the present invention.

Referring now to FIG. 6, a piston sealing ring assembly 50 according to the present invention includes a first piston sealing ring 52 of the same construction as the sealing ring 2 of FIG. 1 and a lower piston sealing ring 54 having an overlapped cut with generally circumferentially extending inner and outer overlapping portions 56 and 58, respectively, the radial width inner portion 56, in this embodiment being about one third of the outer portion 58. The sealing ring 52 has first and second planar bounding surfaces 6 and 8, respectively.

The inner and outer portions 56,58 of the overlapped cut meet along a generally axially and circumferentially extending sealing interface which provides a continuous seal from the first surface 6 to the second surface 8. This seal defines an inner ring gap 62 in fluid communication with the space defined by the surfaces 10 of the two sealing rings 52,54 and the inner surface 26 of the annular recess 20 in which it is located in use and an outer ring gap 64 in communication with the piston/cylinder gap at the higher pressure side of the piston.

A pin 66 fixed in and extending from the upper side of the sealing ring 54 is an easy fit in a hole (not shown) in the lower side of the sealing ring 52 to maintain the ring gap 4 of the sealing ring 52 out of alignment with the overlapping cut of the sealing ring 54. This arrangement could be inverted.

In use, the sealing ring 52 is forced downwards by the higher pressure fluid so that a periphery of the outer ring gap 64, namely the one at surface 6 of the sealing ring 54, is sealed by the surface 8 of the sealing ring 52 by the higher pressure fluid. There is then a path for the higher pressure fluid from the ring gap 4 to inner ring gap 62 but no fluid communication to the outer ring gap 64 so providing a unidirectional seal. The sealing ring 52 can have a larger inner diameter than the sealing ring 54 as long as the outer ring gap 64 is sealed by surface 8 of the sealing ring 52 as just described.

The individual sealing rings 2,2' of the piston ring sealing assembly can be made more readily than that of FIG. 3 because only one-axis milling is required. The planar surfaces 6,8 of the individual piston sealing rings 2,2' on which accurate sealing of the ring gap 64 depends are easier to manufacture to the tolerances required to achieve good sealing than the finger/notch structure of FIG. 3. The wider outer portion 58 is exposed to wear rather than the thinner inner portion 56 so providing longer wear characteristics without increasing the overall width of the rings and hence using more materials.

Figure 7:
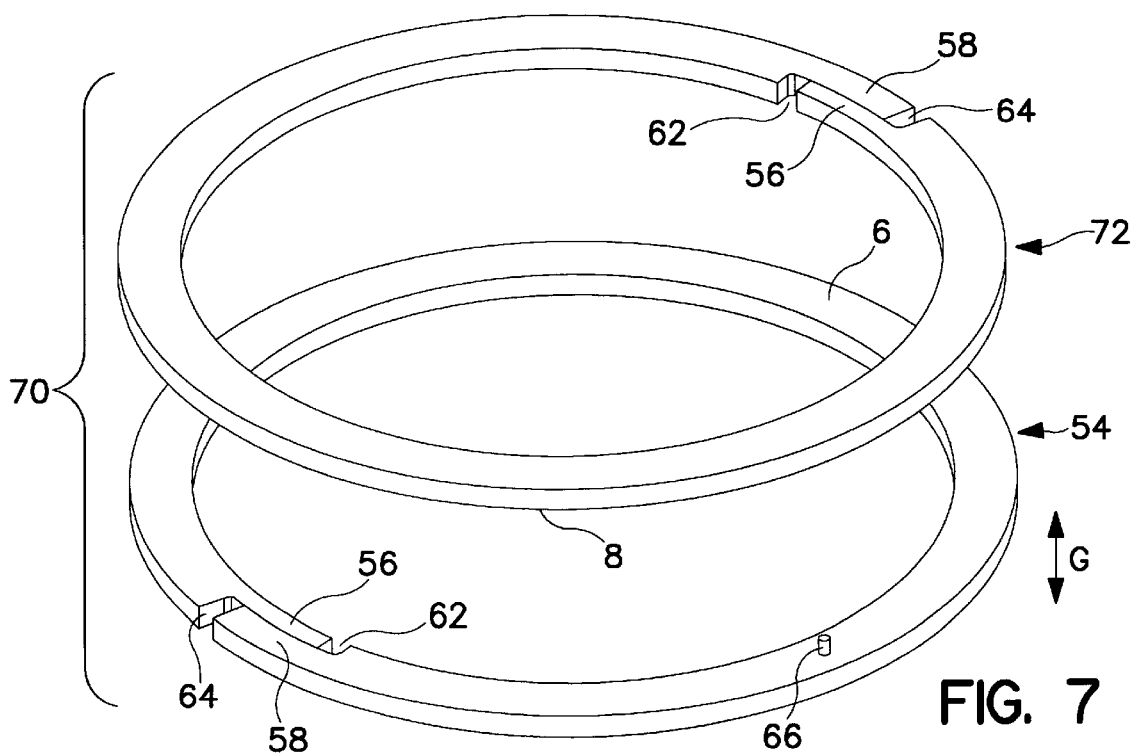
FIG. 7 is an exploded perspective view of a second embodiment of a piston sealing ring assembly according to the present invention.

Referring now to FIG. 7, a second embodiment 70 of a piston sealing ring assembly of the present invention has an overlapped cut sealing ring 54 as that of the embodiment of FIG. 6 but in which the straight cut sealing ring 52 of the embodiment of FIG. 6 has been replaced by a further sealing ring 72 which is substantially identical to the other sealing ring 54. It differs in that there is no pin 66 and it has instead a hole (not shown) for engagement with the pin 66 of the sealing ring 54 to maintain the two overlapped joints of the sealing rings 54 and 70 out of registration so that a periphery of each outer ring gap 64 of each sealing ring 54, 70 is, in use, sealed by the surface of the outer sealing ring overlying the ring gap 64.

This embodiment provides sealing from both directions and so is useful for sealing a double action fluid pump or compressor and it can do so with an assembly of similar axial height to the prior art seals which can only provide uni-directional sealing. Each sealing ring 54,72 of this embodiment also has the characteristics discussed with reference to sealing ring 54 of the embodiment of FIG. 6.

Whilst the piston sealing ring assembly of the present invention finds particular application in oil-free gas compressors which includes, for example gas pressure boosters which further compress a gas already compressed above atmospheric pressure, they could also be employed in oil lubricated pumps or compressors if there is a need to reduce still further the leakage present in such apparatus. This is particularly relevant for compressor, vacuum pump and gas booster applications for use with light or low density gases such as hydrogen and helium.

What is claimed is:

1. An oil-free reciprocating gas compressor or vacuum pump apparatus, said apparatus comprising a cylinder and a piston arranged to reciprocate within the cylinder, said piston comprising a rider ring retained in an annular recess in the periphery of the piston, said rider ring being a non-sealing fit in the cylinder and being arranged to centre the piston in the cylinder during said reciprocating movement, and a piston sealing ring assembly carried by the piston and including a first and a second cut piston sealing ring each bounded by first and second planar surfaces, a second planar surface of the first piston sealing ring overlying a first planar surface of the second sealing ring, each piston sealing ring having an overlapped cut with generally circumferentially extending inner and outer overlapping portions which contact each other to form a continuous seal extending from the first planar surface to the second planar surface of the piston sealing ring and separating an inner ring gap and an outer ring gap, the overlapped cut of the first piston sealing ring being circumferentially offset from the overlapped cut of the second piston sealing ring whereby the periphery of the outer ring gap of the first piston sealing ring at its second planar surface is sealed by the first planar surface of the second piston sealing ring and the periphery of the outer ring gap of the second piston sealing ring at its first planar surface is sealed by the second planar surface of the first piston sealing ring.

2. Apparatus as claimed in claim 1 in which the outer overlapped portion of the overlapped cut of each piston sealing ring is wider in the radial direction than the inner portion of the overlapped cut.

3. Apparatus according to claim 2 wherein the outer overlapped portion of the overlapped cut is substantially two times wider in the radial direction than the inner portion of the overlapped cut.

4. Apparatus according to claim 1 in which the inner portion of the overlapped cut is formed so as to be resiliently biased towards the outer portion of the overlapped cut.

5. Apparatus according to claim 1 including interlocking means for retaining the first a second piston sealing rings in a position whereby the two overlapped cuts are circumferentially offset from each other.

6. Apparatus according to claim 5 wherein the interlocking means comprises a pin fixed in one of the piston sealing rings and engageable in a hole in the other piston sealing ring.

7. Apparatus according to claim 1 wherein the sealing rings are formed from PTFE or a PTFE compound.

8. Apparatus according to claim 7 wherein the PTFE material is carbon graphite filled PTFE or impregnated carbon graphite filled PTFE.

9. Apparatus according to claim 1 wherein the piston acts as a double-acting piston.

10. A double action gas compressor comprising apparatus according to claim 9.

11. Apparatus according to claim 1 wherein both piston sealing rings are located in a single annular recess in the outer surface of the piston, said recess consisting of two axially spaced apart surfaces connected at their radially inward ends substantially only by a single right cylindrical surface such that the recess has a substantially constant depth.

12. Apparatus according to claim 1 wherein the piston has a diameter which is between 1 and 3 mm smaller than the diameter of the cylinder.

13. Apparatus according to claim 1 wherein the first and second cut piston sealing rings have substantially the same width in the radial direction.

14. An oil-free reciprocating gas compressor or vacuum pump apparatus, said apparatus comprising a cylinder and a piston arranged to reciprocate within the cylinder, said piston comprising a rider ring retained in an annular recess in the periphery of the piston, said rider ring being a non-sealing fit in the cylinder and being arranged to centre the piston in the cylinder during said reciprocating movement, and a piston sealing ring assembly carried by the piston and including a first and a second cut piston sealing ring having substantially the same radial width and each bounded by first and second planar surfaces, a second planar surface of the first piston sealing ring overlying a first planar surface of the second sealing ring, each piston sealing ring having an overlapped cut with generally circumferentially extending inner and outer overlapping portions which contact each other to form a continuous seal extending from the first planar surface to the second planar surface of the piston sealing ring and separating an inner ring gap and an outer ring gap, the overlapped cut of the first piston sealing ring being circumferentially offset from the overlapped cut of the second piston sealing ring whereby the periphery of the outer ring gap of the first piston sealing ring at its second planar surface is sealed by the first planar surface of the second piston sealing ring and the periphery of the outer ring gap of the second piston sealing ring at its first planar surface is sealed by the second planar surface of the first piston sealing ring.

* * * * *